(No Model.)
W. A. SEIBEL.
HARNESS ATTACHMENT.
No. 570,964. Patented Nov. 10, 1896.
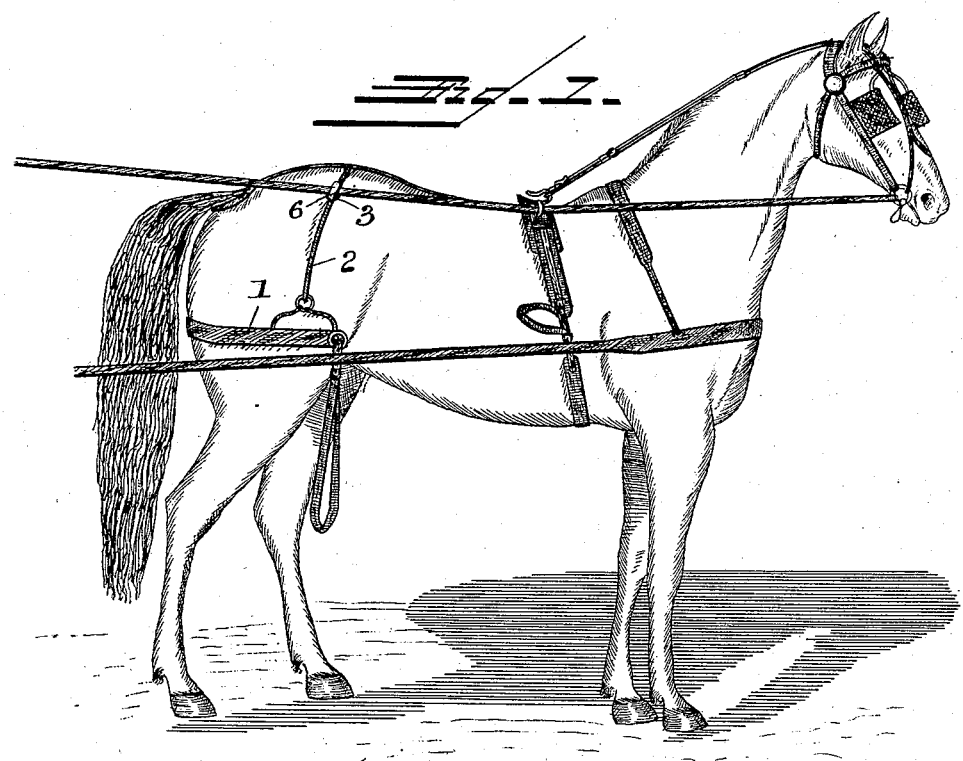
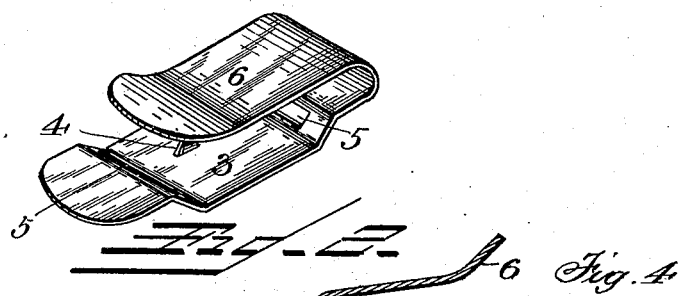
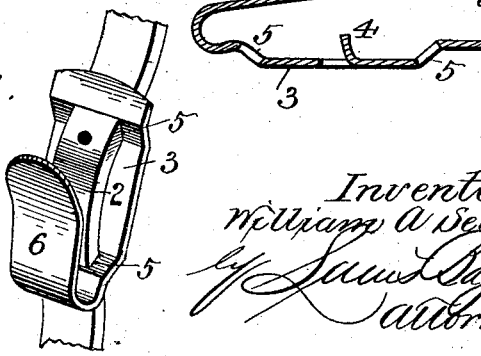
Witnesses:
J. L. Ourand.
Jos. L. Coombs
Inventor:
William A. Seibel,
by Saml Bagger & Co.
Attorneys.

UNITED STATES PATENT OFFICE.

WILLIAM AUGUST SEIBEL, OF INDEPENDENCE, IOWA, ASSIGNOR, BY MESNE ASSIGNMENTS, OF ONE-HALF TO HANS HEINRICH WILHELM HEITMANN, OF SAME PLACE.

HARNESS ATTACHMENT.

SPECIFICATION forming part of Letters Patent No. 570,964, dated November 10, 1896.

Application filed January 13, 1896. Serial No. 575,360. (No model.)

*To all whom it may concern:*

Be it known that I, WILLIAM AUGUST SEIBEL, a citizen of the United States, and a resident of Independence, in the county of Buchanan and State of Iowa, have invented certain new and useful Improvements in Harness Attachments; and I do hereby declare that the following is a full, clear, and exact description of the invention, which will enable others skilled in the art to which it appertains to make and use the same, reference being had to the accompanying drawings, which form a part of this specification.

My invention relates to harness attachments; and its object is to provide a device which is secured to the hip-strap, which supports the breeching or traces, as the case may be, for guiding and holding the lines or reins and preventing them from falling down and engaging with other parts of the harness, and also preventing the tail of the horse being caught by the lines or reins.

The invention consists, essentially, of a metal plate formed with two slots for the passage of the hip-strap and having a tongue integral with the plate, but at an angle thereto and adapted to engage with a hole in said strap, and one end of said plate bent outward and backward, forming a hook with which the lines or reins engage, as hereinafter fully described and claimed.

In the accompanying drawings, Figure 1 is a view of a horse and harness, showing my improvement connected with the hip-strap of the harness. Fig. 2 is a perspective view of the guide or holder detached from the harness.

In the said drawings the reference-numeral 1 designates the breeching, and 2 the hip-strap connected with the same, which passes across the buttocks of the horse.

The numeral 3 designates the holder, consisting of a sheet-metal plate having a tongue 4 formed integral therewith and bent outward at approximately a right angle. This plate is formed with two slots or openings 5 for the passage of the hip-strap, and the metal of the plate between said slots or openings is depressed, so that said strap can readily pass through the slots or openings and lie flat upon the plate. The lower end of the said plate is bent or curved outward and then backward or upward, forming a hook 6.

In practice the guide or holder is connected with the hip-strap, which passes through the openings or slots therein, and the tongue 2, engaging with a hole in the strap to hold it in place.

From the above it will be seen that when the reins or lines are slackened they will engage with the hook and be held between the same and the hip-strap and prevented from falling down and catching other parts of the harness. They will also prevent the horse's tail from being thrown over the lines or reins.

Of course it will be understood that two of these guides or holders will be employed, one at each side of the horse.

Having thus fully described my invention, what I claim is—

As an improved article, a line or rein guide or holder adapted to be connected with the hip-strap of a harness, consisting of a metal plate having the ends inclined outwardly and then extended outwardly in a straight line and the inclined portions formed with rectangular slots, and one of said ends bent backwardly forming a curved hook, and the inwardly-extending tongue formed integral with said plate, substantially as described.

In testimony that I claim the foregoing as my own I have hereunto affixed my signature in presence of two witnesses.

WILLIAM AUGUST SEIBEL.

Witnesses:
 JOSEPH DREXLER,
 D. S. DEERING.